Patented Apr. 1, 1941

2,237,074

UNITED STATES PATENT OFFICE 2,237,074

SUGAR DERIVATIVES OF 1,2-DIAMINO-4,5-DIMETHYL-BENZENES AND PROCESS FOR THE MANUFACTURE OF SAME

Paul Karrer, Zurich, Switzerland, assignor to Hoffman-La Roche Inc., Nutley, N. J., a corporation of New Jersey No Drawing. Application August 6, 1936, Serial No. 94,702. In Germany August 23, 1935

5 Claims. (Cl. 260—211)

The derivatives of 1,2-diamino-4,5-dimethyl-benzene having a pentose or hexose radicle substituted in an amino group and consequently corresponding to the formulae

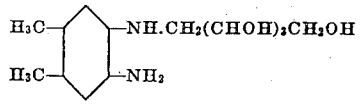

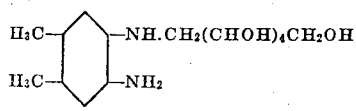

are valuable intermediates for preparing flavines. It has been found that these derivatives may be obtained by coupling [3,4-dimethyl - phenyl]-amino-pentoses or -hexoses with diazonium salts and treating the azo-dyestuffs thus obtained with reducing agents. As reducing agents hydrogen and nickel, zinc and acetic acid, sodium-hydrosulphate and the like may be used. The reaction takes place according to the following equation in which R is phenyl, R₁ a pentose or hexose radicle:

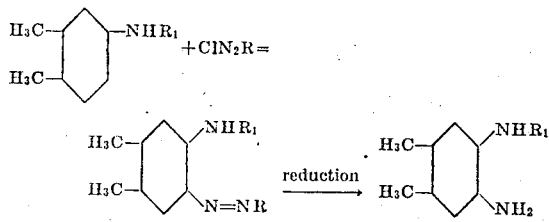

The sugar derivatives of 1,2-diamino-4,5-dimethyl-benzene thus obtained may be converted into flavines by allowing alloxan to react with the solution obtained after the reduction.

It could not be foreseen that [3,4-dimethyl-phenyl]-amino-pentoses or -hexoses would allow themselves to be coupled with diazonium salts, because in other chemical reactions, for instance in nitrating, they are found to be inert and behave differently from the simple amines. It was moreover uncertain whether in the coupling process the azo radicle would enter the ortho-position to the amino-sugar-group, as two other positions are likewise available.

Example 1

2 parts by weight of [3,4-dimethyl-phenyl]-laevo-arabamine melting at 123° C. (obtained by condensation and simultaneous hydrogenation of 1-amino-3,4-dimethyl-benzene and arabinose as shown in "Helvetica Chimica Acta," volume 18, 1935, page 1132) are dissolved in water and a diazo solution, obtained in the usual manner from 1 part by weight of p-nitraniline, is dropped in. A dark precipitate of the azo-dyestuff is immediately formed and is removed by suction and recrystallised from dilute alcohol. The azo-compound is then dissolved in hot alcohol and hydrogenated in an autoclave with hydrogen and nickel at 100° under 15 atmospheres pressure. After removal of the nickel catalyst there remains a colourless solution, containing the 1-amino-2-arabinamino-4,5-dimethyl-benzene. After acidifying, evaporating and treatment with alloxan, 6,7-dimethyl-9-[laevo-arabityl]-iso - alloxazine is obtained.

Example 2

[3,4-dimethyl - phenyl]-laevo - arabinamine is coupled in aqueous solution with diazotized 2,4-dinitraniline. The azo-dyestuff thus obtained is almost insoluble in water and is immediately precipitated in red-brown flakes. Its reduction yields 1-amino-2-arabinamino-4,5-dimethyl-benzene.

Example 3

[3,4-dimethyl - phenyl]-d - ribamine (obtained by condensation and simultaneous hydrogenation of 1-amino-3,4-dimethyl-benzene and di-ribose as shown in "Helvetica Chimica Acta," volume 18, 1935, pages 1132–1133) is coupled in aqueous solution with diazotized p-nitraniline. The precipitated azo-dyestuff is reduced after recrystallization from dilute alcohol with hydrogen and nickel or zinc and acetic acid. The resulting solution contains 1 - [d-ribityl - amino] - 2-amino-4,5-dimethyl-benzene. By the addition of alloxan 6,7-dimethyl-9-[d-ribityl]-isoalloxazine is obtained.

Example 4

[3,4-dimethyl-phenyl]-d-arabamine is coupled in aqueous solution with diazotized aniline at a slightly acid reaction. One part by weight of the precipitated azo-dyestuff is dissolved after recrystallization from alcohol in 150 parts by weight of boiling alcohol, then about one fifth part by volume of water is added and saturated sodium-hydrosulphite-solution dropped in until the red-orange colour of the liquid has disappeared. By the addition of concentrated hydrochloric acid the reaction product is then made slightly acid to Congo paper and evaporated in vacuo. The residue is extracted with 20 parts by weight of warm acetic acid whereby the greater part is dissolved. By adding alloxan to this solution 6,7-dimethyl-9-[d-arabityl]-iso-alloxazine is obtained.

I claim:
1. The 1-[d-ribityl-amino]-2-amino-4,5-dimethyl-benzene.
2. The process for the manufacture of 1-[d-ribityl-amino]-2-amino-4,5-dimethyl benzene, which consists in coupling [3,4-dimethyl-phenyl]-d-ribamine with a diazonium salt and treating the azo-dyestuff thus obtained with a reducing agent.
3. The process for the manufacture of 1-[d-ribityl-amino]-2-amino-4,5-dimethyl-benzene, which consists in coupling [3,4-dimethyl-phenyl]-d-ribamine with diazotized p-nitraniline and treating the azo-dyestuff thus obtained with zinc and acetic acid.
4. The process for the manufacture of derivatives of 1,2-diamino-4,5-dimethyl-benzene of the formula

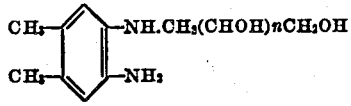

which consists in coupling 3,4-dimethyl-phenyl-amino sugars of the formula

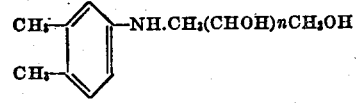

wherein $n$ is a numeral selected from the group consisting of the numerals 3 and 4, with diazonium salts and treating the azo dyestuffs thus obtained with reducing agents.
5. The process for the manufacture of pentose derivatives of 1,2-diamino-4,5-dimethyl-benzene, which consists in coupling 3,4-dimethyl-phenyl-amino-pentoses with diazonium salts and treating the azo dyestuffs thus obtained with reducing agents.

PAUL KARRER.